US009834467B2

(12) United States Patent
Bisson et al.

(10) Patent No.: US 9,834,467 B2
(45) Date of Patent: Dec. 5, 2017

(54) METHOD AND APPARATUS FOR MAKING A PROFILED TUBING AND A SLEEVE

(71) Applicant: Corning Incorporated, Corning, NY (US)

(72) Inventors: Antoine Gaston Denis Bisson, Corning, NY (US); Patrick Joseph Cimo, Corning, NY (US); Thierry Luc Alain Dannoux, Avon (FR); Ronan Tanguy, Grez sur Loing (FR)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 14/422,462

(22) PCT Filed: Aug. 29, 2013

(86) PCT No.: PCT/US2013/057248
§ 371 (c)(1),
(2) Date: Feb. 19, 2015

(87) PCT Pub. No.: WO2014/036236
PCT Pub. Date: Mar. 6, 2014

(65) Prior Publication Data
US 2015/0225279 A1 Aug. 13, 2015

Related U.S. Application Data

(60) Provisional application No. 61/694,913, filed on Aug. 30, 2012.

(51) Int. Cl.
*C03B 23/07* (2006.01)
*C03B 40/04* (2006.01)
(Continued)

(52) U.S. Cl.
CPC .............. *C03B 23/07* (2013.01); *C03B 17/04* (2013.01); *C03B 23/045* (2013.01);
(Continued)

(58) Field of Classification Search
CPC ......... C03B 23/07; C03B 40/04; C03B 17/04; C03B 23/0476; C03B 23/045; C03B 33/06; Y10T 428/131
See application file for complete search history.

(56) References Cited

U.S. PATENT DOCUMENTS

| 2,502,312 A | 3/1950 | Danner ........................... 49/17.1 |
| 3,298,808 A | 1/1967 | Macks .............................. 65/25 |

(Continued)

FOREIGN PATENT DOCUMENTS

| DE | 1025581 | 2/1957 |
| JP | 48001099 | 1/1973 |

(Continued)

OTHER PUBLICATIONS

CN201380056877.6 First Office Action dated Oct. 18, 2016, China Patent Office.
(Continued)

*Primary Examiner* — Michael C Miggins

(57) ABSTRACT

An apparatus (100) for making glass tubing (200) of a desired non-circular cross-sectional profile (cf FIG. 3) includes a mandrel (101) adapted for positioning proximate heat-softened tubing. The mandrel (101) has a nose (102) and a nozzle section (120) with a chosen profile that will define a final cross-sectional profile of the tubing. The nozzle section (120) has a feed chamber (140) for receiving a gas from a source (207) and a porous and/or foraminous circumferential surface (132,134) through which the gas can be discharged to an exterior of the mandrel. The gas discharges to the exterior of the mandrel, forming a film of pressurized gas in the gap (314, 318) between the porous circumferential surface (132,134) and the heat-softened tubing (200). A method of forming tubing having a non-circular cross-sectional profile using the apparatus is also provided. A glass sleeve made from the reshaped or formed tubing is
(Continued)

also disclosed: a monolithic sleeve made of parallel, opposite, flat and smooth front and back covers for use in an electronic device (cf FIG. 13). Some glass-ceramic materials may also be suitable for the tubing, such as transparent beta spodumene.

32 Claims, 12 Drawing Sheets

(51) Int. Cl.
*C03B 17/04* (2006.01)
*C03B 23/047* (2006.01)
*C03B 23/045* (2006.01)
*C03B 33/06* (2006.01)

(52) U.S. Cl.
CPC .......... *C03B 23/0476* (2013.01); *C03B 33/06* (2013.01); *C03B 40/04* (2013.01); *Y10T 428/131* (2015.01)

(56) References Cited

U.S. PATENT DOCUMENTS

| | | | |
|---|---|---|---|
| 5,080,705 A | 1/1992 | Ott et al. | 65/87 |
| 7,475,567 B2 | 1/2009 | Maenner et al. | 65/86 |
| 7,600,399 B2 | 10/2009 | Bogdahn et al. | |
| 2006/0141181 A1 | 6/2006 | Langsdorf et al. | 428/34.4 |

FOREIGN PATENT DOCUMENTS

| | | |
|---|---|---|
| JP | 1974-8685 | 2/1974 |
| JP | 5626733 | 3/1981 |
| KR | 2004000922 | 1/2004 |
| WO | 2010132419 | 11/2010 |
| WO | 2012047784 | 4/2012 |

OTHER PUBLICATIONS

JP2015530030 Office Action dated Nov. 15, 2016, Japan Patent Office.
European Patent Office; International Search Report; dated Jan. 3, 2014; pp. 1-5.

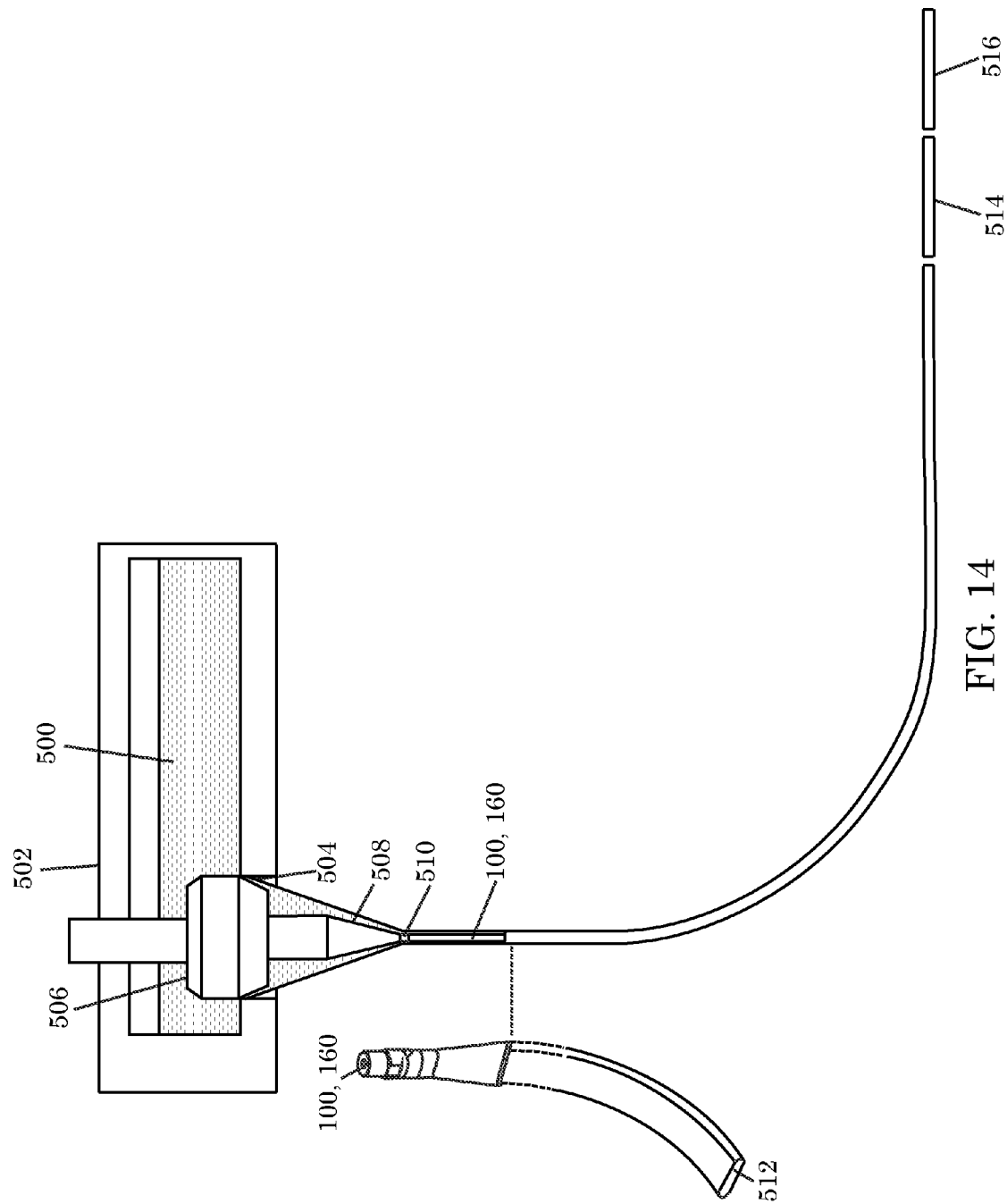

METHOD AND APPARATUS FOR MAKING A PROFILED TUBING AND A SLEEVE

CROSS-REFERENCE TO RELATED APPLICATIONS

This application claims the benefit of priority under 35 U.S.C. §371 of International Application Serial No. PCT/US13/57248, filed Aug. 29, 2013, which, in turn, claims the benefit of priority of U.S. Provisional Application Ser. No. 61/694,913, filed on Aug. 30, 2012, the content of which is relied upon and incorporated herein by reference in their entireties as if fully set forth below.

FIELD

The invention relates to manufacture of three-dimensional (3D) glass articles.

BACKGROUND

Glass has been used as front covers for electronic devices. Electronic device manufacturers are now desiring that the back covers of electronic devices are also made of glass and that the back covers meet the same high dimensional accuracy and surface quality as the front covers. It is possible to make the front and back covers separately with the requisite dimensional accuracy and surface quality and then assemble them together. However, this adds extra steps to the manufacturing process and may result in loss of dimensional control. The alternative is to manufacture a monolithic glass sleeve, where the front side of the glass sleeve will serve as the front cover and the back side of the glass sleeve will serve as the back cover. Many electronic devices incorporate flat displays. Thus the monolithic glass sleeve would need to have a cross-sectional profile that can accommodate a flat display. In general, this cross-sectional profile will have flat sides that can be arranged in parallel to the flat display. The flatness of the flat sides would also have to meet stringent requirements specified by the electronic device manufacturers.

It is known to make glass tubing and then convert the glass tubing into containers. Thus one practical approach to making a monolithic glass sleeve would be to make a glass tubing having the desired cross-sectional profile and then cut the glass tubing into glass sleeves. Methods for forming glass tubing from molten glass are known. The most common ones are the Danner process, the Vello process, and the downdraw process. These processes are described in, for example, Heinz G. Pfaender, "Schott Guide to Glass," 2nd ed., Chapman & Hall, 1996. These processes are typically used to form glass tubing with a round cross-sectional shape. Extrusion can be used to form glass tubing with a non-round cross-sectional shape, e.g., a cross-sectional shape that could have flat sides. However, extrusion involves tool contact with the glass surface, which could diminish the surface quality of the glass.

SUMMARY

In one aspect, the present invention relates to an apparatus for making a profiled tubing. The apparatus includes a mandrel adapted for positioning proximate a surface of a tubing. The mandrel has a nozzle section with a select cross-sectional profile that will define a final cross-sectional profile of the tubing. The nozzle section has a feed chamber for receiving a gas and a porous circumferential surface through which the gas can be discharged to an exterior of the mandrel. The gas when discharged to the exterior of the mandrel forms a film of pressurized gas between the porous circumferential surface and the tubing.

In one embodiment, the apparatus further comprises a tubing forming apparatus for forming the tubing, wherein the mandrel is arranged inline with the tubing forming apparatus.

In one embodiment, the nozzle section is made of a porous material having a porosity of 10 to 20% and a mean pore size of 10 μm or less.

In one embodiment, the nozzle section is perforated.

In one embodiment, the porous circumferential surface comprises a pair of edge surfaces that are in opposing relation and ramped relative to a tool axis along which the mandrel is aligned.

In one embodiment, the porous circumferential surface further comprises a pair of side surfaces that are in opposing relation and form webs between the pair of edges surfaces.

In one embodiment, each of the pair of side surfaces has a depressed area.

In one embodiment, the apparatus further includes at least a pair of edge chambers formed in the nozzle section and in communication with the feed chamber. Each of the pair of edge chambers is adjacent to and substantially parallel to one of the pair of edge surfaces.

In one embodiment, the apparatus further includes a pair of chamber clusters formed in the nozzle section. Each chamber cluster includes at least two edge chambers in communication with the feed chamber. Each chamber cluster is adjacent to and substantially parallel to one of the pair of edge surfaces In one embodiment, the at least two edge chambers of each chamber cluster are equidistant from the adjacent edge surface.

In one embodiment, the at least two edge chambers of each chamber cluster have different lengths.

In another aspect, the present invention relates to a method of forming a profiled tubing made of a glass material. The method includes disposing a mandrel proximate to a surface of a tubing. The mandrel has a nozzle section with a select cross-sectional profile that will define a final cross-sectional profile of the tubing. The method includes discharging a gas from a porous circumferential surface of the nozzle section to create a film of pressurized gas between the nozzle section and the surface of the tubing. The film of pressurized gas exerts pressure on the surface of the tubing that is sufficient to locally deform the tubing into conformity with the nozzle section. The method includes advancing the film of pressurized gas along a length of the tubing. The method includes heating the tubing such that in any local section of the tubing where the film of pressurized gas is exerting pressure, the local section of the tubing is at a viscosity at which the local section of the tubing can be deformed by the pressure.

In one embodiment, the tubing has an initial circumference before being conformed to the nozzle section and a final circumference after being conformed to the nozzle section. The method includes selecting the tubing such that a ratio of the initial circumference to the final circumference is between 0.7 and 0.95.

In one embodiment, deformation of the tubing into conformity with the nozzle section includes stretching a wall of the tubing by 5 to 30%.

In one embodiment, the method includes delivering the gas to a feed chamber in the nozzle section at a pressure of 1 to 10 atm.

In one embodiment, the film of pressurized gas has a thickness in a range from 60 μm to 70 μm.

In one embodiment, the method further includes arranging the mandrel inline with a tubing forming apparatus that forms the tubing.

In one embodiment, the select cross-sectional shape is oblong.

In one embodiment, the method further includes cutting at least one sleeve from a section of the tubing that has been deformed into conformity with the nozzle section.

In one embodiment, discharging the gas includes a combination of discharging the gas from the porous circumferential surface and venting the gas from depressed areas of the porous circumferential surface such that the film of pressurized gas is locally created between the tubing and the nozzle section.

In another aspect, the present invention relates to a sleeve made of a glass material. The sleeve has a seamless wall. The wall has an inner surface with a surface roughness less than 1 μm and an outer surface with a surface roughness less than 1 μm. The wall also has opposed flat sections. Each of the flat sections has a flatness better than 50 μm on an area of 70×120 mm².

In one embodiment, the sleeve has an oblong cross-sectional shape.

It is to be understood that both the foregoing summary and the following detailed description are exemplary of the present invention and are intended to provide an overview or framework for understanding the nature and character of the present invention as claimed. The accompanying drawings are included to provide a further understanding of the present invention and are incorporated in and constitute a part of this specification. The drawings illustrate various embodiments of the present invention and together with the summary and detailed description serve to explain the principles and operation of the present invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity or conciseness.

FIG. 14 shows a continuous glass tubing process incorporating use of the conforming tool of FIG. 1.

DETAILED DESCRIPTION

Figure 1:
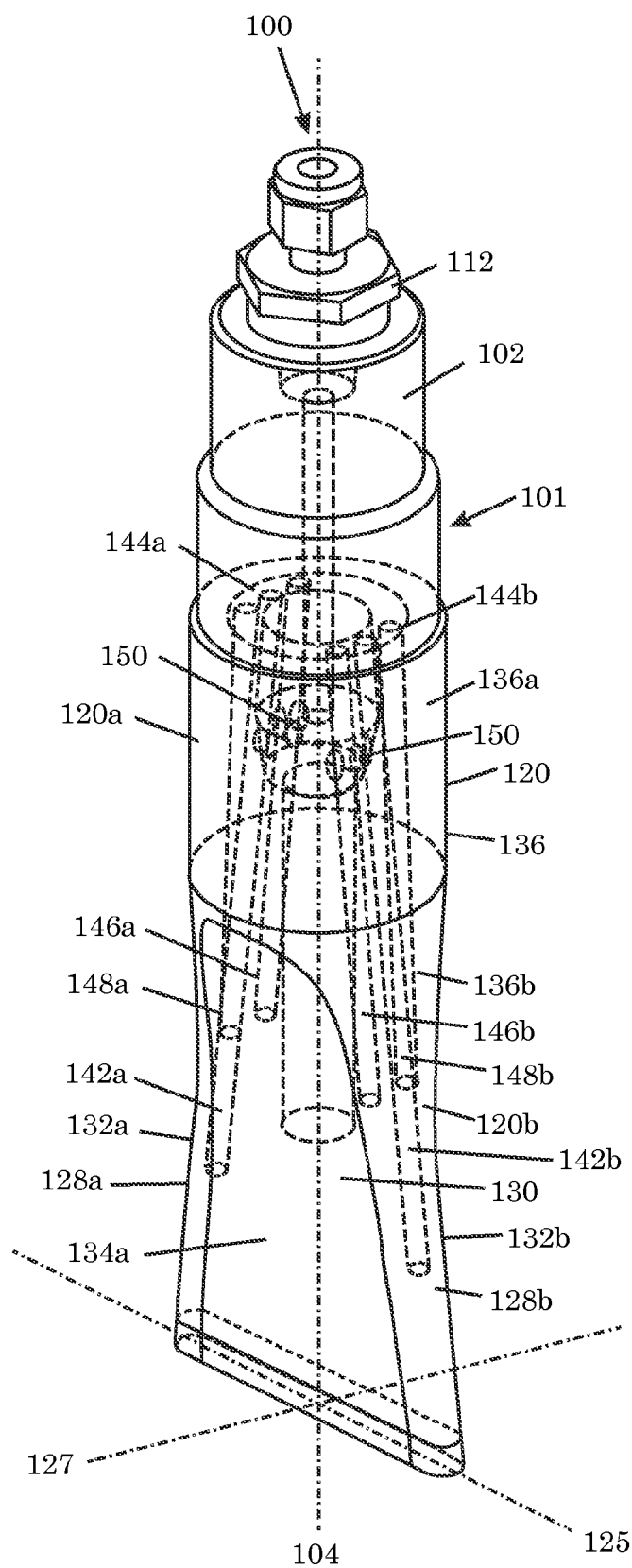
FIG. 1 is a perspective view of a conforming tool.

In the following detailed description, numerous specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as not to unnecessarily obscure the invention. In addition, like or identical reference numerals may be used to identify common or similar elements.

FIG. 1 shows a conforming tool 100 for non-contact shaping of an initial tubing made of a glass material into a profiled tubing. The glass material will typically be glass. The glass material may also be glass-ceramics, but only glass-ceramics that can avoid nucleation or crystallization under the shaping conditions will generally be suitable. A possible example of glass-ceramics is transparent beta spodumene, available as KERALITE from Eurokera. The choice of glass is much wider and would be based on the desired properties of the profiled tubing or sleeves to be made from the profiled tubing. The conforming tool 100 can be used with ion-exchangeable glasses, which are generally desired in applications where toughness and damage resistance are important. Examples of ion-exchangeable glasses are alkali-aluminosilicate glasses or alkali-aluminoborosilicate glasses. The conforming tool 100 can also be used with glasses having high coefficient of thermal expansion.

Figure 2A:
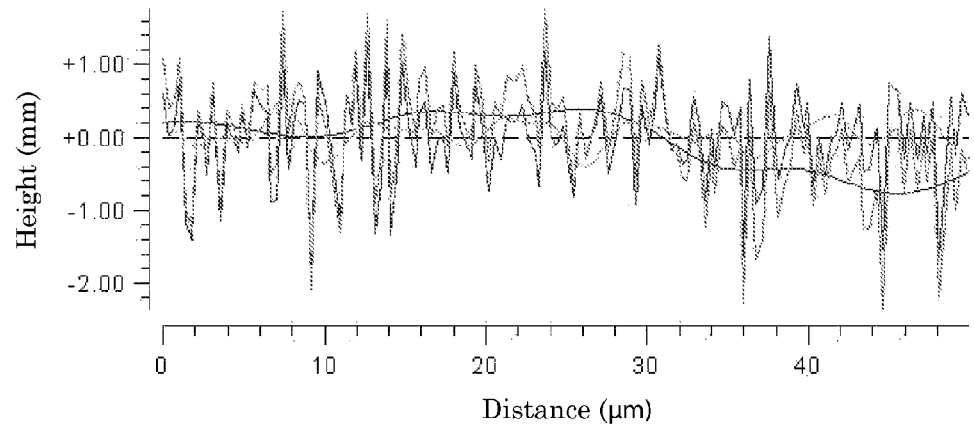
FIG. 2A is a surface roughness profile of a glass sleeve formed by the conforming tool.
Figure 2B:
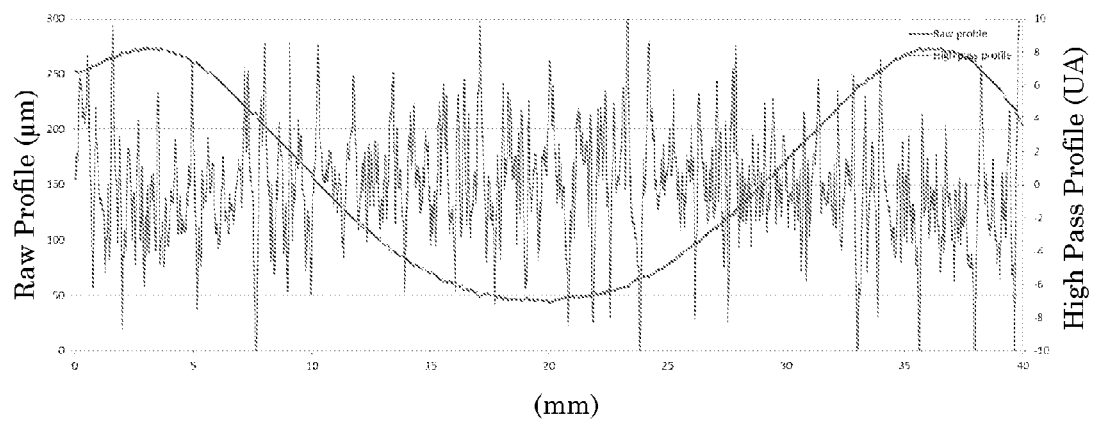
FIG. 2B is a surface roughness profile of a glass surface formed by a prior art method.

In one embodiment, the conforming tool 100 is configured as a mandrel 101 that can be inserted inside a tubing. For shaping of the tubing, the conforming tool 100 generates a gas bearing that exerts forming pressure on the tubing and acts as a barrier between the conforming tool 100 and the tubing. The gas barrier will allow the surface quality of the tubing to be preserved through the shaping process with the conforming tool 100. The gas barrier can prevent imperfections such as streaking from developing on the inner surface of the tubing during the shaping process. FIG. 2A shows an inner surface roughness profile of a glass sleeve cut from a glass tubing shaped by the conforming tool 100. The profile shows that the glass sleeve has a maximum inner surface roughness of 0.18 nm. The surface roughness measurement shown in FIG. 2A was made on a Zygo Interferometer. For comparative purposes, FIG. 2B shows an inner surface roughness profile of a rectangular glass sleeve cut from a glass tubing shaped by a prior art method that involved contact of a tool with the wall of the glass tubing. For the prior art sleeve, streaks on the glass surface were measured. The streaks appeared as waves with 1 μm amplitude (peak to valley distance) and a 0.6 mm period. If the amplitude is taken as a measure of surface roughness, then the maximum surface roughness observed in the prior art sleeve will be approximately 1 μm, which is much greater than the surface roughness of the glass sleeve made using the conforming tool 100. Further, the streaks are apparent on the surface when viewed with the naked eye because they introduce a significant and very local slope change to the surface, ultimately producing a glass cover that looks distorted and unattractive.

In one embodiment, a profiled tubing or sleeve shaped by the conforming tool 100 has an inner surface roughness less than 1 μm on 40 mm length and an outer surface roughness less than 1 μm on 40 mm length. In another embodiment, a profiled tubing or sleeve shaped by the conforming tool 100 has an inner surface roughness in a range from 0.2 nm to 10 nm on a 40 μm×40 μm area and an outer surface roughness in a range from 0.2 nm to 10 nm on a 40 μm×40 μm area. It should be noted that since the surface quality of the tubing is preserved through the shaping process, the surface roughness of the tubing after shaping by the conforming tool 100 will depend on the surface roughness of the tubing before shaping by the conforming tool 100. Therefore, the specification of the surface roughness for the tubing shaped by the conforming tool 100 is also a specification of the surface roughness for the tubing prior to being shaped by the conforming tool 100.

The conforming tool 100 is configured to shape a tubing from an initial cross-sectional profile to a final cross-sectional profile, where the final cross-sectional profile is different from the initial cross-sectional profile. The cross-sectional profile of the tubing is characterized by a shape and a size. Therefore, shaping of the tubing may involve shape transformation and/or dimensional transformation. In one embodiment, the conforming tool 100 is used to shape a tubing from an initial round cross-sectional shape to a final non-round cross-sectional shape. In a more specific embodiment, the final non-round cross-sectional shape is an oblong shape. "Oblong" means elongated. In one embodiment, the oblong shape has an aspect ratio greater than 5:1. In another embodiment, the oblong shape has an aspect ratio greater than 10:1.

Figure 3A:
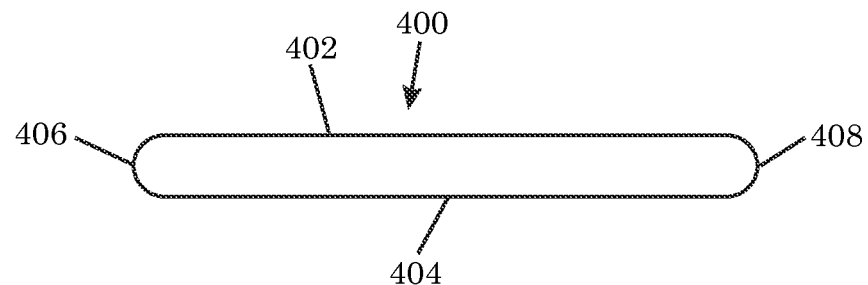
FIGS. 3A-3G are oblong cross-sectional shapes.
Figure 3B:
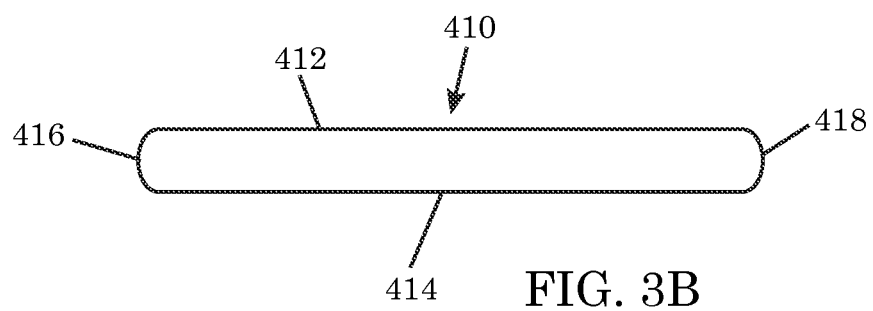
Figure 3C:
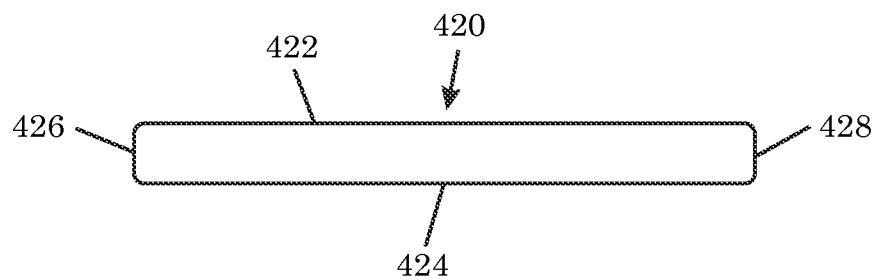
Figure 3D:
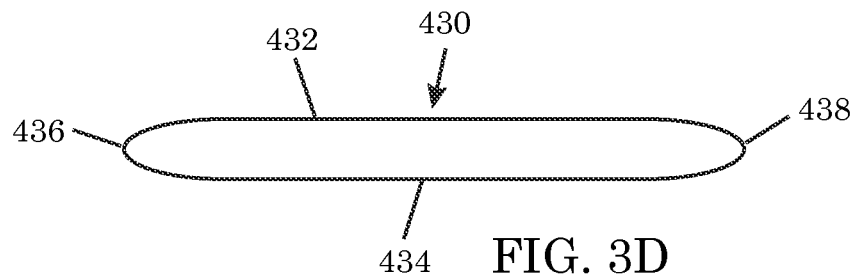
Figure 3E:
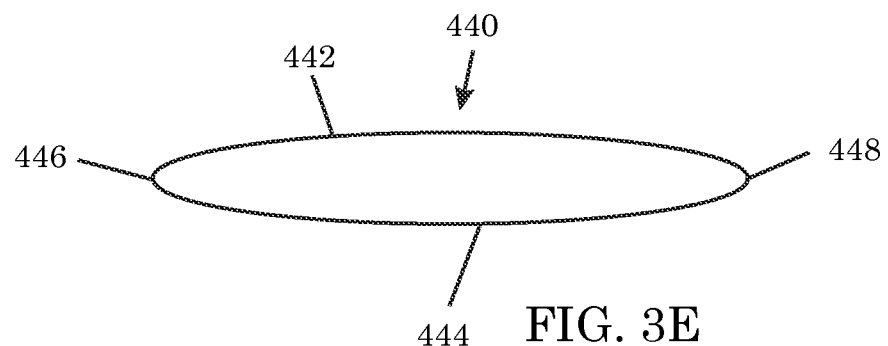
Figure 3F:
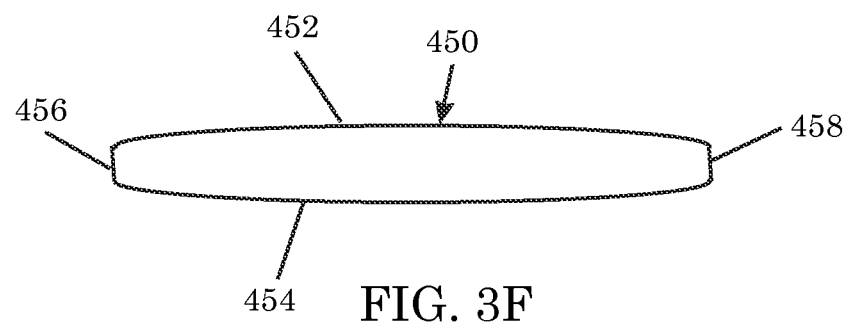
Figure 3G:
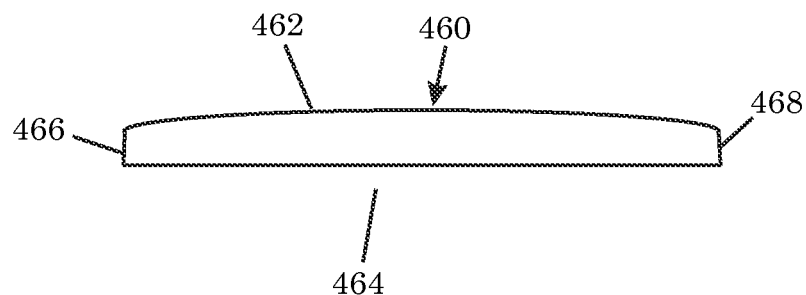

Several examples of oblong cross-sectional shapes are shown schematically in FIGS. 3A-3G. These oblong shapes are made of different combinations of splines, radiuses, tapers, and flats. FIG. 3A shows an oblong shape 400 with flat sides 402, 404 and round ends 406, 408. FIG. 3B shows an oblong shape 410 with flat sides 412, 414 and round ends 416, 418. FIG. 3B is similar to FIG. 3A, with the exception that the ends 416, 418 are rounded with a smaller radius than the ends 406, 408. In FIG. 3C, oblong shape 420 has flat sides 422, 424 and flat ends 426, 428, i.e., a rectangle. In FIG. 3D, oblong shape 430 has flat sides 432, 434 and tapered ends 436, 438. FIG. 3E shows an oblong shape 440 with splined sides 442, 444 and splined ends 446, 448. FIG. 3F shows an oblong shape 450 with splined ends 452, 454 and flat ends 456, 458. FIG. 3G shows an oblong shape 460 with a splined side 462, a flat side 464, and flat edges 466, 468. The oblong shape 460 is asymmetric.

Figures 4A, 4B:
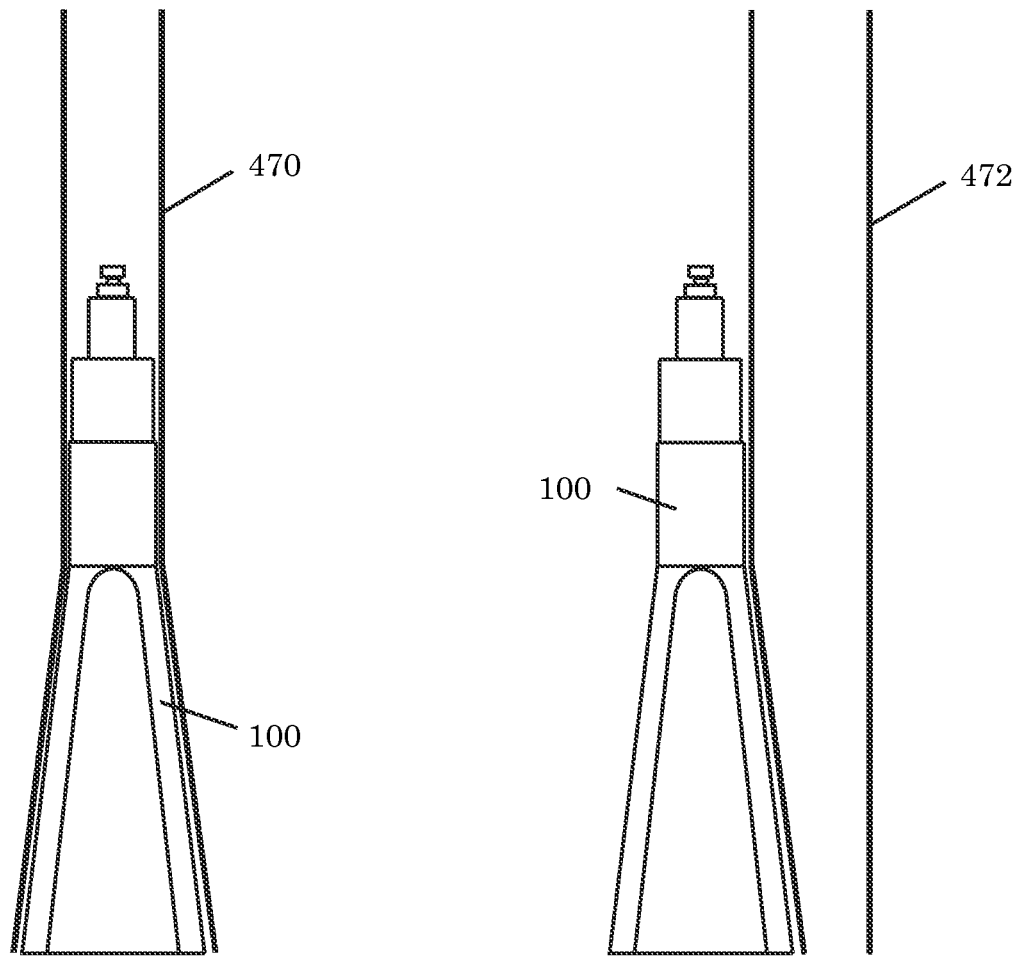
FIG. 4A shows the conforming tool used as an internal shaping tool.
FIG. 4B shows the conforming tool used as an external shaping tool.

When the conforming tool 100 is used as an internal tool, convex cross-sectional profiles, such as shown in FIGS. 3A-3G, can be formed in the tubing. FIG. 4A shows an example of using the conforming tool 100 as an internal tool for shaping a tubing 470. To form concave or convex-concave cross-sectional profiles, the conforming tool 100 may be used as an external tool that is located outside of the tubing. FIG. 4B shows an example of using the conforming tool 100 as an external tool for shaping a tubing 472. When the conforming tool 100 is used as an external tool, the gas bearing generated by the conforming tool 100 will be between the outer surface of the tubing and the conforming tool 100. Without making any modifications to the conforming tool 100, the conforming tool 100 will not circumscribe the circumference of the tubing and will apply the shaping force only in a section of the circumference of the tubing. The conforming tool 100 may be rotated about the tubing if full coverage of the shaping force along the circumference is desired. Alternatively, the conforming tool 100 can be reconfigured to a ring shape that will circumscribe the circumference of the tubing. It is also conceivable that any combination of internal and external, gas bearing and non-gas-bearing, conforming tools may be used to shape the tubing.

Returning to FIG. 1, the mandrel 101 is aligned with a tool axis 104 and may be symmetric or asymmetric about the tool axis 104. Typically, the mandrel 101 will be symmetric about the tool axis 104. The mandrel 101 is made of a nose 102 and a nozzle 120. The nose 102 and nozzle 120 can be formed as separate parts that are joined together or as an integral body. The nose 102 forms the leading part of the conforming tool 100 and aids insertion of the mandrel 101 into a tubing, whereas the nozzle 120 forms the trailing part of the conforming tool 100 and determines the shape to which the tubing will be conformed. The nose 102 is shaped and sized for entry into the tubing under initial conditions of the tubing. That is, if $D_{TT}$ is the initial cross-sectional dimension of the tubing and $D_M$ is the maximum cross-sectional dimension of the nose 102, then $D_M$ is less than $D_{TT}$. The nose 102 may be generally tubular in shape and may have a cross-sectional profile that is generally round in shape. In this embodiment, the glass tubing may also have an initial cross-sectional profile that is round in shape. In this case, $D_M$ can be the maximum cross-sectional diameter of the nose 102 and $D_{TT}$ can be the initial cross-sectional diameter of the tubing. However, the cross-sectional shape of the nose 102 is not limited to a round shape, and neither is the initial cross-sectional shape of the tubing.

Figure 5:
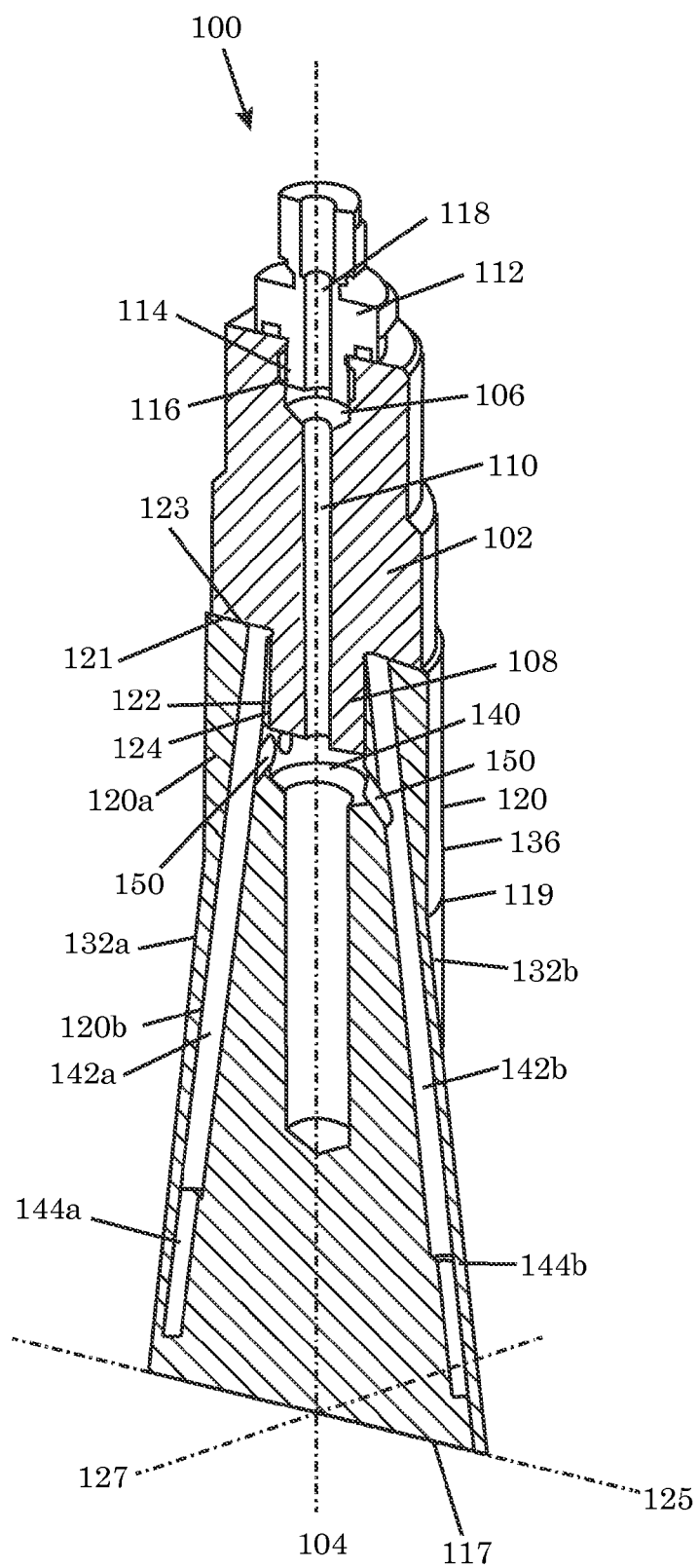
FIG. 5 is a cross-section of FIG. 1 along the tool axis.

Referring to FIG. 5, the top end of the nose 102 includes a connection port 106, and the bottom end of the nose 102 includes a connection pin 108. The connection port 106 receives a connection 114 of a plug 112 located above the nose 102. The plug 112 is coupled to the nose 102 by securing the connection pin 114 to the connection port 106 by a suitable method, such as a threaded or welded connection between the connection pin 114 and the wall 116 of the connection port 106. The connection pin 108 extends into a connection port 122 in the nozzle 120. The nose 102 is coupled to the nozzle 120 by securing the connection pin 108 to the connection port 122 by a suitable method, such as a threaded, welded, or bonded connection between the connection pin 108 and the wall 124 of the connection port 122. A conduit runs 110 runs through the nose 102, from the connection port 106 to the connection pin 108. The conduit 110 may be straight and axially aligned with the tool axis 104. Alternatively, the conduit 110 may not be straight and/or axially aligned with the tool axis 104.

The plug 112 has a conduit 118 that is in communication with the conduit 110 in the nose 102 via the connection port 106. The conduit 118 may be straight and axially aligned with the tool axis 104. Alternatively, the conduit 118 may not be straight and/or not axially aligned with the tool axis 104. Regardless of the configurations of the conduits 110, 118, communication between the conduits 110, 118 should be possible. The plug 112 can be coupled to a pipe (not shown), which can be coupled to a source of gas, for delivery of gas to the conduits 110, 118. The gas delivered to the conduit 110 will ultimately be delivered to the nozzle 120. The gas may be air or an inert gas such as nitrogen. As in the case of the nose 102, the plug 112 is shaped and sized for entry into the tubing under initial conditions of the tubing. That is, if $D_P$ is the maximum cross-sectional dimension of the plug 112 and $D_{TT}$ is the initial cross-sectional dimension of the tubing, then $D_P$ is less than $D_{TT}$.

Returning to FIG. 1, the nozzle 120 has an upper section 120a, which like the preceding nose 120 is shaped and sized for entry into the tubing under initial conditions of the tubing. If the maximum cross-sectional dimension of the upper nozzle section 120a is $D_{NU}$ and the initial cross-sectional dimension of the tubing is $D_{TI}$, then $D_{NU}$ is less than $D_{TI}$, and preferably $D_{NU}$ is approximately equal to $D_{TI}$ minus 2δ, where δ is the width of a gas bearing gap that will be formed between the upper nozzle section 120a and the tubing when the mandrel 101 is inserted in the tubing. The upper nozzle section 120a can be tubular in shape and have a cross-sectional shape in a plane transverse to the tool axis 104 that is round. In general, the upper nozzle section 120a will have a cross-sectional shape that matches or is similar to the initial cross-sectional shape of the tubing. This is so that an even gas bearing gap can be formed between the upper nozzle section 120a and the tubing when the upper nozzle section 120a is inserted in the tubing. Even pressurized gas in the even gas bearing gap may have the effect of centering the upper nozzle section 120a within the tubing.

Figure 6:
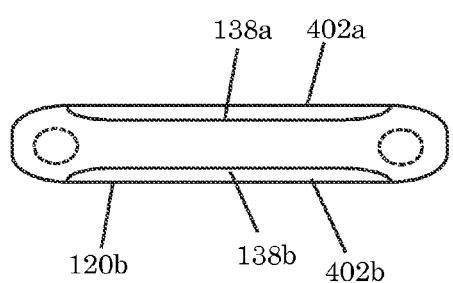
FIG. 6 is a bottom end view of the conforming tool of FIG. 1.

The nozzle 120 has a lower nozzle section 120b, which defines the shape to which the tubing will be conformed during use of the conforming tool 100. For this reason, the cross-sectional shape of the lower nozzle section 120b is dictated primarily by the final cross-sectional shape of the tubing, although the cross-sectional shape of the lower nozzle section 120b may not be an exact copy of the final cross-sectional shape. In one embodiment, the lower nozzle section 120b has a non-round cross-sectional profile. In a more specific embodiment, the lower nozzle section 120b has an oblong cross-sectional profile, where "oblong" means elongated. The aspect ratio of the oblong shape may be as previously mentioned for the final cross-sectional shape of the tubing. FIG. 6 shows an example of a cross-sectional shape of the lower nozzle section 120b that is suitable for forming the tubing or sleeve final cross-sectional shape shown in FIG. 3A. In the case of the lower nozzle section 120b, there are depressions 138a, 138b in the "flat" sides 402a, 402b of the oblong shape. These depressions are for flux venting and will enable forming of the flat sides 402, 404 shown in FIG. 3A.

Figure 7:
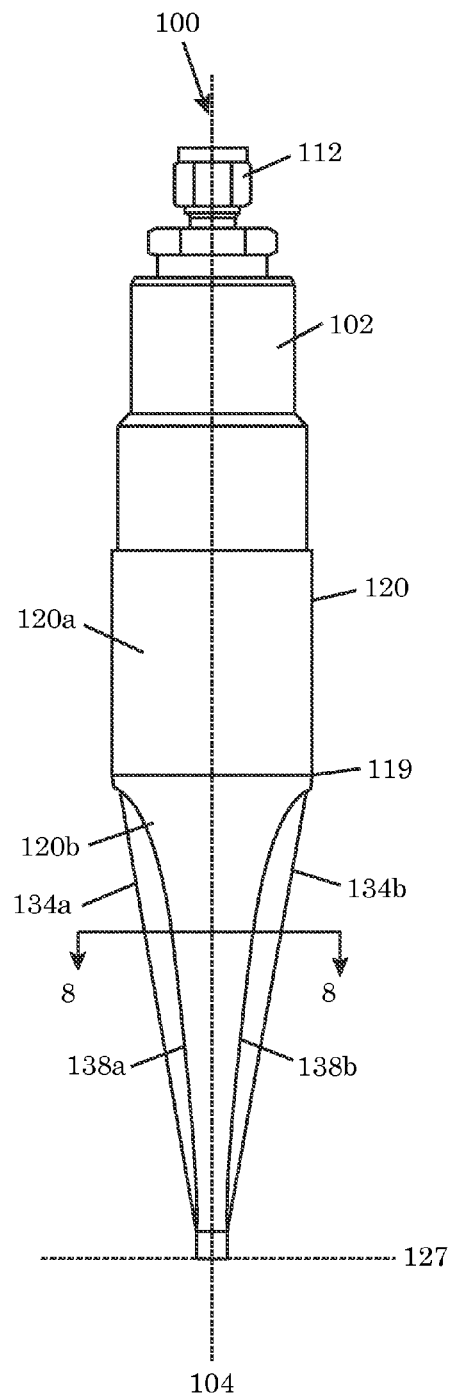
FIG. 7 is a side view of the conforming tool of FIG. 1.

In one embodiment, the lower nozzle section 120b has a bi-tapered shape made of a major tapered shape and a minor tapered shape. Referring to FIG. 5, the major width of the lower nozzle section 120b, as measured along axis 125 that is transverse to the tool axis 104, is gradually narrowing in a direction towards the nose 102. The major width of the lower nozzle section 120b defines the major tapered shape. The minor width of the lower nozzle section 120b, as measured along axis 127 that is transverse to the tool axis 104 and orthogonal to axis 125, is gradually narrowing in a direction away from the nose 102. The tapering of the minor width is best seen in FIG. 7. The minor width of the lower nozzle section 120b defines the minor tapered shape.

In FIG. 5, the smallest major dimension of the lower nozzle section 120b occurs at the intersection 119 of the lower nozzle section 120b with the upper nozzle section 120b and will generally be the same as the largest dimension of the upper nozzle section 120b. The largest major dimension of the lower nozzle section 120b occurs at the bottom end 117 of the nozzle 120 (or the distal end of the nozzle 120 remote from the nose 102). If $D_{TF}$ is the final dimension of the tubing, i.e., the dimension of the tubing after shaping by the conforming tool 100, and $D_{NL}$ is the maximum major dimension of the lower nozzle section 120b, then $D_{NL}$ is approximately equal to $D_{TF}$ minus 2δ, where δ is the width of a gas bearing gap that will be formed between the lower nozzle section 120b and the tubing during use of the conforming tool 100. Typically, δ will be determined by the thickness of the pressurized gas film to be created between the lower nozzle section 120b and the tubing.

Returning to FIG. 1, the lower nozzle section 120b has opposed edges 128a, 128b with edge surfaces 132a, 132b, respectively, that are ramped relative to the tool axis 104. The lower nozzle section 120b has a web 130 extending between and connecting the opposed edges 128a, 128b. The web 130 has opposed side surfaces 134a, 134b (in FIG. 7), which are contiguous with the edge surfaces 132a, 132b. The distance between the edge ramped surfaces 132a, 132b in a direction transverse to the tool axis 104 defines the major width of the lower nozzle section 120b. The distance between the side web surfaces 134a, 134b in a direction transverse to the tool axis 104 defines the minor width of the lower nozzle section 120b. The edge ramped surfaces 132a, 132b and web side surfaces 134a, 134b together define a lower nozzle circumferential surface 136b. The upper nozzle section 120a has an upper nozzle circumferential surface 136a. Together, the circumferential surfaces 136a, 136b make up the circumferential surface 136 of the nozzle 120.

The web surfaces 134a, 134b have depressed areas 138a, 138b, respectively, which will serve as venting flux sites during use of the conforming tool 100. Referring to FIG. 5, in one embodiment, the ramped surfaces 132a, 132b are symmetrically disposed about the tool axis 104, and the inclination angles of the ramped surfaces 132a 132b relative to the tool axis 104 are the same. In alternate embodiments, the ramped surfaces 132a, 132b may be asymmetrically disposed about the tool axis 104 and/or have different inclination angles relative to the tool axis 104. The inclination angles of the ramped surfaces 132a, 132b will generally be a function of the width of the lower nozzle section 120b at the intersection 119, the width of the lower nozzle section 120b at the bottom end 117, and the height of the lower nozzle section 120b. Typically, the inclination angles will be selected such that gradual shaping of the glass tubing is achieved.

A feed chamber 140 is formed in the nozzle 120. The feed chamber 140 extends from the connection port 122 to a non-distal point in the lower nozzle section 120b. The feed chamber 140 is in communication with the conduit 110 of the nose 102. Two edge chambers 142a 142b are formed in the nozzle 120. The edge chambers 142a, 142b extend from the top end 123 of the nozzle 120 to non-distal points in the lower nozzle section 120b. The edge chambers 142a, 142b are offset from the feed chamber 140. In one embodiment, the feed chamber 140 is axially aligned with the tool axis 104, and the edge chambers 142a, 142b are disposed symmetrically about the tool axis 104. However, it is possible in other embodiments that the feed chamber 140 may not be axially aligned with the tool axis 104 and/or the edge chambers 142a, 142b may be disposed asymmetrically about the tool axis 104.

Figure 8:
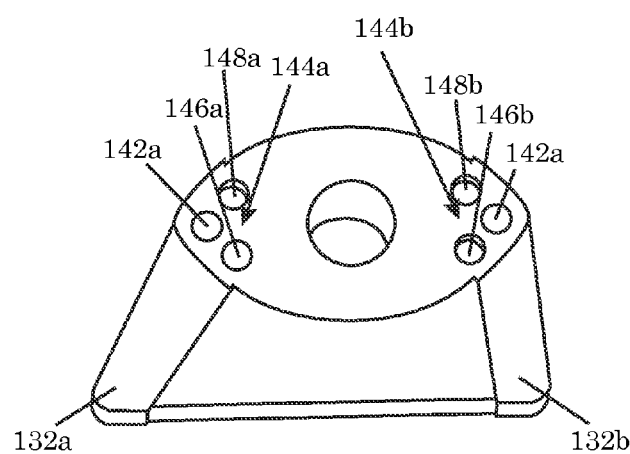
FIG. 8 is a cross-section of FIG. 7 along line 8-8.

The edge chambers 142a, 142b are arranged on opposite sides of the nozzle 120, with the edge chamber 142a being adjacent to the ramped surface 132a and the edge chamber 142b being adjacent to the ramped surface 132b. In FIGS. 1 and 8, the edge chamber 142a may be one of a plurality of chambers in a chamber cluster 144a adjacent to the ramped surface 132a. For example, the chamber cluster 144a may include edge chambers 146a, 148a in addition to the edge chamber 142a. Similarly, the edge chamber 142a may be one of a plurality of chambers in a chamber cluster 144b adjacent to the ramped surface 132b. For example, the chamber cluster 144b may include edge chambers 146b, 148b in addition to the edge chamber 142b.

The chamber clusters 144a, 144b are disposed symmetrically about the tool axis 104. However, it is possible in other embodiments that the chamber clusters 144a, 144b may be disposed asymmetrically about the tool axis 104. The edge chambers 142a, 142b, 146a, 146b, 148a, 148b are generally tubular in shape. The cross-sectional shape of each of the edge chambers 142a, 142b, 146a, 146b, 148a, 148b may be circular or oblong. In one embodiment, each of the edge chambers in each of the chamber clusters 144a, 144b, have different lengths. However, it is possible that in other embodiments the lengths of the edge chambers in each of the chamber clusters 144a, 144b may be the same. The lengths of the edge chambers 142a, 142b, 146a, 146b, 148a, 148b will affect distribution of the gas discharged from the adjacent ramped surfaces 132a, 132b during use of the conforming tool 100.

In one or more embodiments, the edge chambers 142a, 146a, 148a are oriented in the same direction as the adjacent ramped surface 132a, i.e., the edge chambers 142a, 146a, 148a are substantially parallel to the adjacent ramped surface 132a. In one embodiment, the edge chambers 142a, 146a, 148a are distributed along the adjacent ramped surface 132a in such a way that they are substantially parallel to and substantially equidistant from the adjacent ramped surface 132a. Similarly, in one or more embodiments, the edge chambers 142b, 146b, 148b are oriented in the same direction as the adjacent ramped surface 132b. That is, the edge chambers 142b, 146b, 148b, i.e., the edge chambers 142b, 146b, 148b are substantially parallel to the adjacent ramped surface 132b. Also, in one embodiment, the edge chambers 142b, 146b, 148b are distributed along the adjacent ramped surface 132a in such a way that they are substantially parallel to and substantially equidistant from the adjacent ramped surface 132b. It is possible to arrange the edge chambers so that they are not equidistant from their respective adjacent ramped surface. The edge chambers essentially serve as plenums for distribution of gas to the ramped surfaces 132a, 132b.

Referring to FIG. 1, the edge chambers 142a, 142b, 146a, 146b, 148a, 148b are in communication with the feed chamber 140 via interconnecting holes 150 in the nozzle 120. The nozzle 120 is porous, which means that the edge chambers 142a, 142b, 146a, 146b, 148a, 148b are also in communication with the feed chamber 140 via the porous structure of the nozzle 120. The feed chamber 140 and edge chambers 142a, 142b, 146a, 146b, 148a, 148b are in communication with the ramped surfaces 132a, 132b and web surfaces 134a, 134b via the porous structure of the nozzle 120. The ramped surfaces 132a, 132b and web surfaces 134a, 134b, being part of the nozzle 120 that is porous, are porous and allow fluid supplied to the feed chamber 140 and edge chambers 142a, 142b, 146a, 146b, 148a, 148b to be discharged to the exterior of the nozzle 120 or mandrel 101.

The porous structure of the nozzle 120 may be due to the material used in making the nozzle 120 or due to perforations in the nozzle 120. In one embodiment, the nozzle 120 is made of a porous material, examples of which include porous graphite, porous silicon carbide, and porous zirconia. It should be noted that porous silicon carbide and porous zirconia are prone to stick with glass. Therefore, when these materials are used, it may be desirable to coat them with high-temperature non-stick material, i.e., in case the nozzle 120 accidentally contacts the tubing while the glass material of the tubing is soft. The porosity of the porous material may be in a range from 10% to 20%. Preferably, the porous material will have a mean pore size less than 50 μm to allow for precise machining of the nozzle 120. More preferably, the porous material will have a mean pore size of 10 μm or less. In another embodiment, the nozzle 120 is made of a non-porous or semi-porous material that is perforated to provide the nozzle 120 with the desired pore structure. The perforations may be made by machining or other suitable method for forming holes in a body.

Gas flow through a porous layer depends on gas pressure, layer thickness, and material permeability. The pore structure of the nozzle 120 is selected to achieve the desired permeability of the nozzle 120 to gas. Preferably, the pore structure of the nozzle 120 is such that permeability of the nozzle 120 to gas is homogeneous and sufficiently low to allow the development of a gas cushion in the gas bearing gap that can counteract the attraction forces created by the surface of the tubing. The gas pressure to create the gas cushion will generally be in a range of 1 to 10 atm. This low gas pressure range is allowed by the arrangement of the gas distribution chambers 142a, 142b, 146a, 146b, 148a, 148b in the nozzle 120 and a sufficient distance between the gas distribution chambers and the surface of the nozzle 120. Too large a gas pressure should be avoided to limit failure risks. Gas can be distributed by a porous material, allowing uniform flow, both at a small scale and on a large scale area. Other means of distributing gas such as perforations formed in a non-porous or semi-porous material are also possibilities.

Figures 9A, 9B:
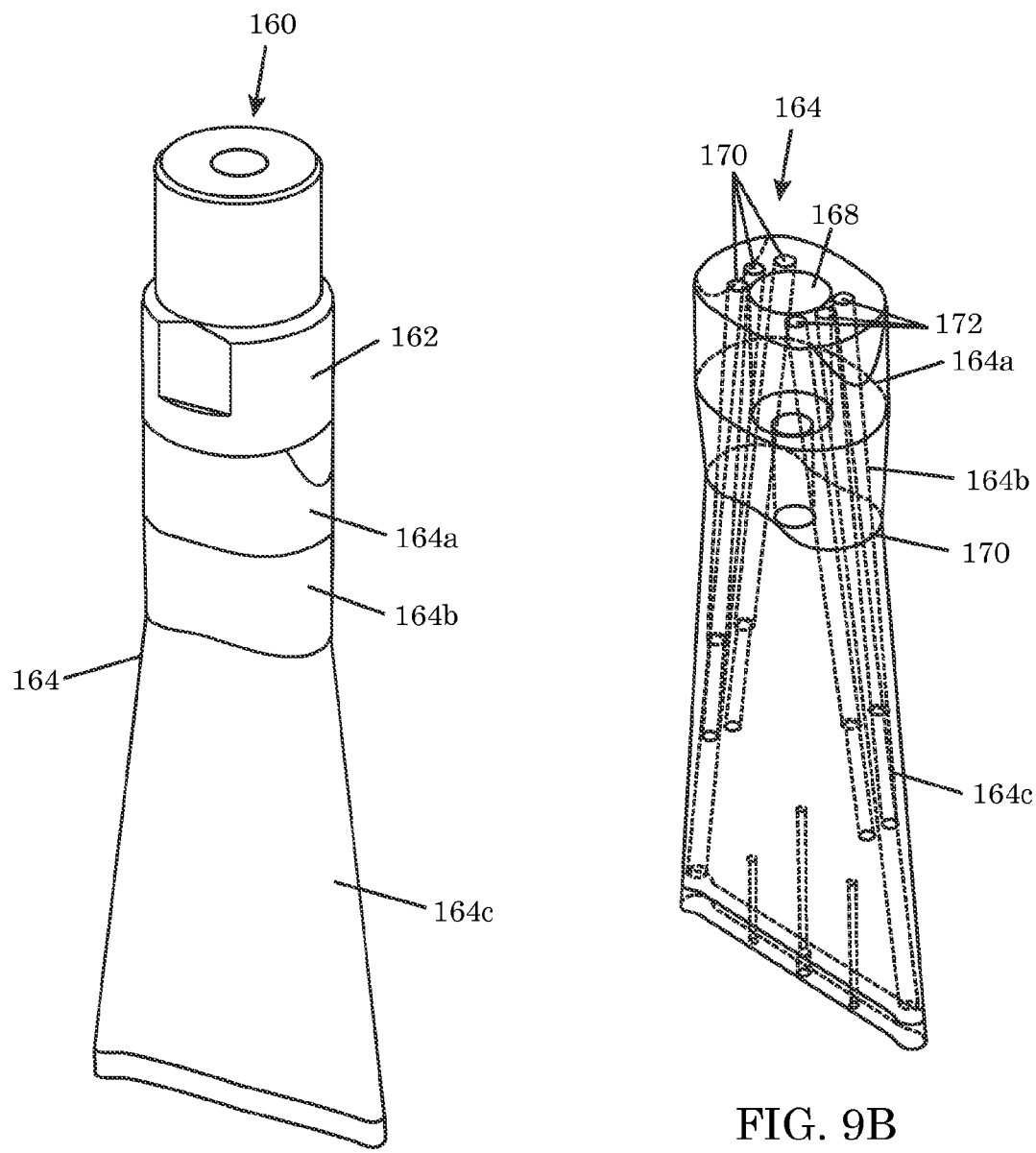
FIG. 9A is a perspective view of another conforming tool.
FIG. 9B shows the nozzle of the conforming tool of FIG. 9A.

FIG. 9A shows another mandrel 160 having a nose 162 and a nozzle 164. The main difference between the mandrel 160 and the mandrel 101 described above appears in the nozzle 164, which is shown separately in FIG. 9B. The nozzle 164 has an upper nozzle section 164a, an intermediate nozzle section 164b, and a lower nozzle section 164c. The edge chambers 170, 172 start from the upper nozzle section 164a, pass through the intermediate nozzle section 164b, and end at non-distal points in the lower nozzle section 164c. The feed chamber 168 extends from the upper nozzle section 164a into the intermediate nozzle section 164b and ends at the interface between the intermediate nozzle section 164b and the lower nozzle section 164b. The upper nozzle section 164a has a generally oval cross-sectional shape. The intermediate nozzle section 164b changes from a generally oval cross-sectional shape at the top interface with the upper nozzle section 164a to a generally splined rectangular shape at the bottom interface with the lower nozzle section 164c. The lower nozzle section 164b is generally bi-tapered as described for the lower nozzle section 120b above. The mandrel 160 may be used to shape a tubing whose initial cross-sectional shape is generally oval or round. FIGS. 9A and 9B show that the mandrel of the conforming tool 100 is not restricted to one shape and also that the nozzle section of the mandrel may have any desired cross-sectional profile to form a desired cross-sectional profile in a tubing.

Figure 10:
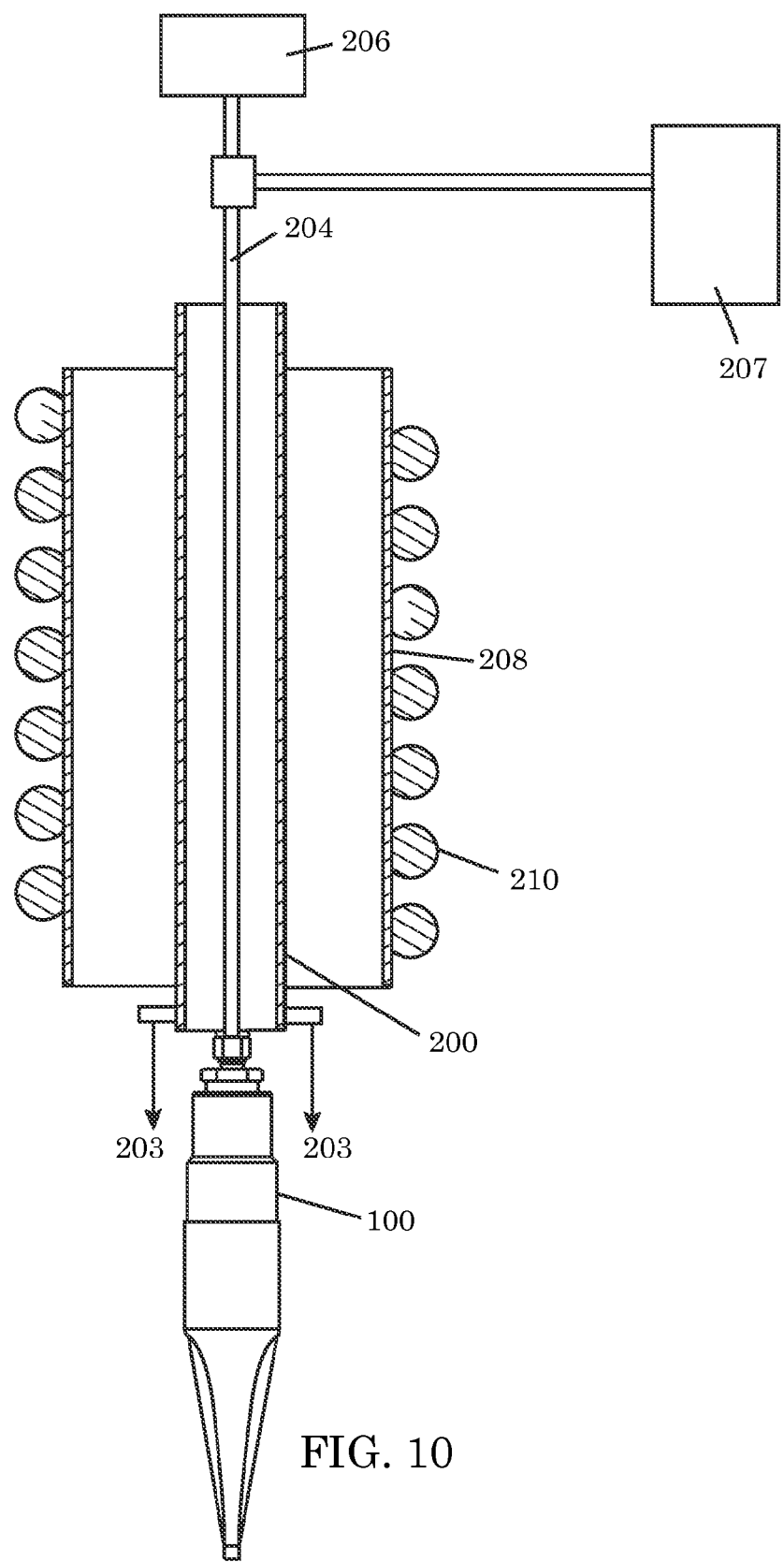
FIG. 10 is a setup for forming a profiled tubing using the conforming tool of FIG. 1.

FIG. 10 shows a setup for shaping a glass tubing 200 using the conforming tool 100. The glass tubing 200 is arranged in a vertical orientation, i.e., with the axial axis of the glass tubing 200 being vertically oriented. In other setups, the glass tubing 200 may be arranged in a horizontal or inclined orientation. The conforming tool 100 is suspended on the end of a pipe 204, which runs through the glass tubing 200. The pipe 204 is preferably a rigid pipe made of a material that can withstand the temperatures at which the glass tubing will be reformed and that also won't generate spurious material that can contaminate the glass tubing. The pipe 204 may be made of stainless steel, for example. The pipe 204 is attached to a support 206 above the glass tubing 200. The pipe 204 is in communication with a fluid source 207. In one embodiment, the fluid source 207 is a source of pressurized gas or air. In operation, the glass tubing 200 is pulled downwardly so that the conforming tool 100 advances along the length of the glass tubing 200 in the upward direction. The pulling force 203 can be provided by any suitable pulling system, such as, for example, a belt tractor that imposes a constant pulling force or a constant speed on the glass tubing 200. Alternatively, the pulling force 203 can be provided by gravity. Alternatively, the glass tubing 200 can be supported in a fixed position and the conforming tool 100 can be pulled upwardly.

The glass tubing 200 extends through a metal cylinder 208, which is disposed within a helical inductor 210. The metal cylinder 208, acting as a susceptor, absorbs electromagnetic energy from the helical inductor 210. The absorbed electromagnetic energy is re-emitted as infrared radiation towards the glass tubing 200. Any portion of the glass tubing 200 within the metal cylinder 208 will be heated by infrared radiation from the metal cylinder 208. The metal cylinder 208 and helical inductor 210 thus constitute one type of heating arrangement of the glass tubing 200. In general, any suitable method and arrangement for heating the glass tubing 200 may be used. Heating may be radiant heating, induction heating, resistive heating, or any combination of the preceding. Other heating methods not specifically mentioned may also be used provided the heating methods can elevate the temperature of the glass tubing 200 to a level at which the glass tubing 200 can be deformed when fluid pressure is applied by the conforming tool 100. The heating arrangement may also provide different temperature zones, e.g., a preheating zone, a reforming zone, and a cooling zone. For a glass material such as Corning code 7740 borosilicate glass, for example, the preheating zone and cooling zone may be at 650° C. while the forming zone is at 780° C.

The entire glass tubing may be heated to a forming temperature $T_1+\delta_1$, where $\delta_1$ is some acceptable margin of error, e.g., less than 11% of $T_1$. $T_1+\delta_1$ is a temperature at which the glass has a relatively low viscosity, e.g., $\leq 10^9$ Poise or in a range from $10^8$ Poise to $10^9$ Poise. Forming temperature $T_1+\delta_1$ may be between the annealing point and softening point of the glass. In one embodiment, forming temperature $T_1+\delta_1$ is at least 20° C. below the softening point. At forming temperature $T_1+\delta_1$, the viscosity of the glass is low enough that the glass can be permanently deformed. While the glass tubing 200 is at the forming temperature $T_1+\delta_1$, the conforming tool 100 can be translated along the glass tubing 200 to shape the glass tubing 200 to the desired final cross-sectional profile. The temperature requirements may be different from what is stated above if the tubing is made of glass-ceramics, particularly if nucleation or crystallization is to be avoided. However, in general, the conforming tool 100 will be applied to the tubing while the tubing is at a temperature at which it can be deformed.

Instead of heating the entire glass tubing 200 to $T_1+\delta_1$, the entire glass tubing 200 may be heated to an initial temperature $T_0+\delta_0$, where $\delta_0$ is some acceptable margin of error, e.g., less than 11% of $T_0$. At initial temperature $T_0+\delta_0$, the glass has a relatively high viscosity, e.g., between $6\times 10^9$ Poise and $10^{12}$ Poise. At initial temperature $T_0+\delta_0$, deformation of the glass tubing or optical defects in the glass tubing can be avoided. Initial temperature $T_0+\delta_0$ may be near the annealing point of the glass. In one embodiment, initial temperature $T_0+\delta_0$ is within 10° C. of the annealing point. The glass tubing 200 can then be locally heated to the forming temperature $T_1+\delta_1$ mentioned above, where $T_1+\delta_1$ is greater than $T_0+\delta_0$. At any instance, the portion of the glass tubing 200 at the forming temperature $T_1+\delta_1$ can be deformed using the conforming tool 100. This means that to shape the entire glass tubing 200 using the conforming tool 100, the local heat and conforming tool 100 will have to be applied along the length of the glass tubing 200.

Figure 11A:
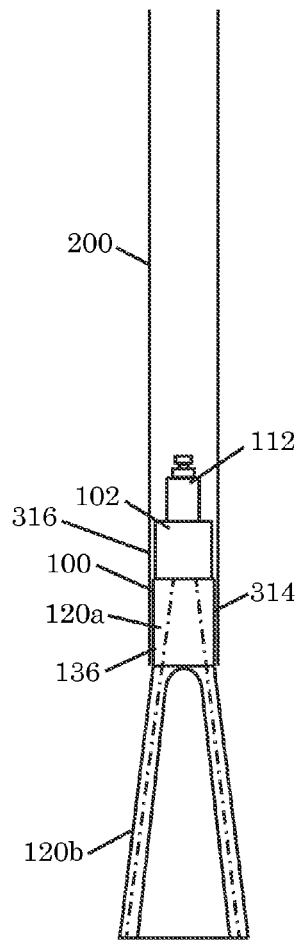
FIGS. 11A-11E illustrate a process of shaping a tubing using the conforming tool of FIG. 1.
Figure 11B:
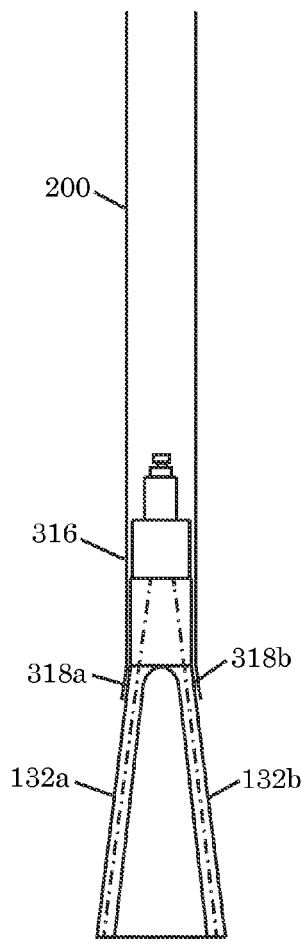

FIGS. 11A-11E illustrates use of the conforming tool 100 to shape the glass tubing 200. The heating arrangement is not specifically shown in these figures. However, as discussed above, for the shaping process to work, the glass tubing has to be at a temperature at which it can be deformed. Relative to the orientation of the glass tubing 200 in FIG. 11A, the process starts from the bottom end of the glass tubing 200. As the glass tubing 200 is pulled downwardly, the plug 112 and nose 102 of the conforming tool 100 first enter the glass tubing 200 through the bottom end of the glass tubing 200. Then, the upper nozzle section 120a follows the nose 102 into the glass tubing 200. At this point, gas is supplied into the chambers of the nozzle 120 and discharged outside of the nozzle 120 via the porous circumference 136 of the nozzle 120. Because of the sizing of the upper nozzle section 120a as discussed above, a circumferential gap 314 is defined between the upper nozzle section 120a and the glass tubing segment 316 in opposing relation to the upper nozzle section 120a. The discharged fluid from the upper nozzle section 120a forms a film of pressurized gas in the circumferential gap 314. The film of pressurized gas in the circumferential gap 134 functions as a gas bearing between the surfaces of the upper nozzle section 120a and the glass tubing 200. The gas bearing exerts pressure on the wall of the glass tubing segment 316. This pressure radially expands the glass tubing segment 316, allowing a small portion of the lower nozzle section 120b to then enter into the glass tubing 200, as shown in FIG. 11B.

Figure 11C:
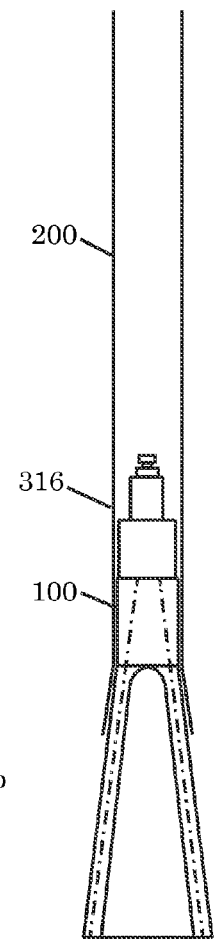
Figure 11D:
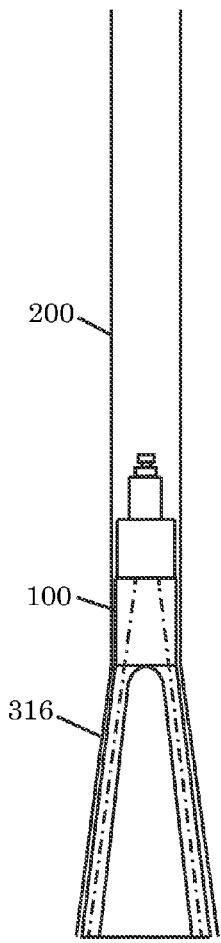
Figure 11E:
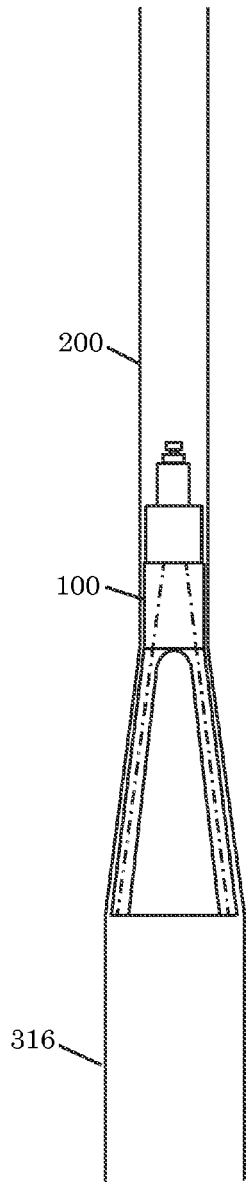

Two gaps 318a, 318b are created between the opposed ramped surfaces 132a, 132b of the lower nozzle section 120b and the glass tubing 102. The discharged gas from the lower nozzle section 120b forms a film of pressurized gas in each of the gaps 318a, 318b. The films of pressurized gas in the gaps 318a, 318b function as gas bearings between the ramped surfaces 132a, 132b and the glass tubing 200. The gas bearings exert pressure on the wall of the glass tubing segment 316. This pressure laterally expands the glass tubing segment 316, allowing more of the lower nozzle section 120b to enter into the glass tubing 200. This process continues until the entire nozzle 120 has entered into the glass tubing 200 and passed through the glass tubing segment 316. As the nozzle 120 passes through the glass tubing segment 316, the glass tubing segment 316 will assume the shape of the nozzle 120, as shown in FIGS. 11C-11E. The last cross-section of the nozzle 120 to pass through any particular point along the length of the glass tubing will determine the cross-sectional profile at that particular point in the tubing.

The conforming tool 100 can be advanced inside and along the glass tubing 200 until the nozzle 120 has completely passed through the entire glass tubing 200 or a desired length of the glass tubing 200. Advancing of the conforming tool 100 can involve pulling the glass tubing 200 downwardly and over the conforming tool 100 as discussed above, pulling the conforming tool 100 upwardly and inside the glass tubing 200, or a combination of the preceding. The conforming tool 100 has to be advanced in a single direction for the conforming or shaping operation. Advancing of the conforming tool 100 can be at a constant or variable speed. However, the speed will need to be tailored such that conforming or shaping of the glass tubing can be completed accurately and efficiently.

Shaping of the glass tubing 200 is achieved by applying gas pressure to the glass tubing 200 while the glass tubing 200 is at the temperature at which it can be deformed. The gas pressure is provided by thin film(s) of pressurized gas created between the glass tubing 200 and the nozzle 120 via discharge of gas from the nozzle 120 as described above. The film(s) of pressurized gas serves not only to exert pressure on the glass tubing 200 but to also separate the conforming tool 100 from the glass tubing 200 so that there is no physical contact between the glass tubing 200 and the conforming tool 100 while the glass tubing 200 is at the forming temperature, where the glass tubing 200 will generally be soft. The thickness of each thin film of pressurized gas is typically in a range from 60 μm to 70 μm, but may be up to 120 μm in some embodiments. The thin film(s) of pressurized gas is translated along the length of the glass tubing 200 as the conforming tool 100 advances along the length of the glass tubing 200. The thin film(s) of pressurized gas constitutes a gas bearing. The width of the gas bearing gap, which will determine the thickness of the film, will depend on glass viscosity, conforming speed (i.e., the speed at which the conforming tool 100 is advancing along the glass tubing), and venting flux in the depressed areas of the nozzle 120.

Figure 12:
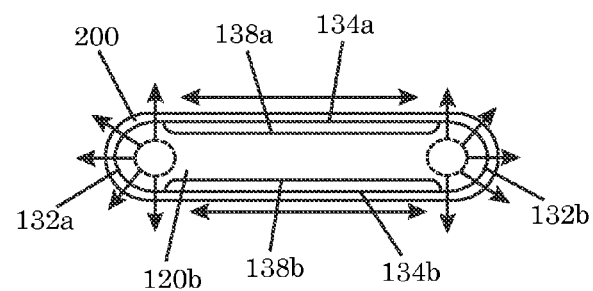
FIG. 12 illustrates gas discharge during use of the conforming tool of FIG. 1.

FIG. 12 shows an end view of the shaping process. Gas is discharged through the ramped surfaces 132a, 132b of the lower nozzle section 120b, wherein the discharged gas forms two gas bearings between the ramped surfaces 132a, 132b and the glass tubing 200. These gas bearings exert opposing forces on the glass tubing 200 to laterally expand the glass tubing 200 in opposite directions. The opposing forces are applied at the portions of the glass tubing 200 in opposing relation to the ramped surfaces 132a, 132b. While the portions of the glass tubing 200 facing the ramped surfaces 132a, 132b are being laterally expanded, the portions of the glass tubing 200 facing the web surfaces 134a, 134b will be flattened. Also, due to venting flux at the depressed areas 138a, 138b in the web surfaces 134a, 134b, films of pressurized gas that can exert pressure on the glass tubing 200 will not be substantially formed between the web surfaces 134a, 134b and the glass tubing 200. The force available for lateral expansion of the glass tubing 202 will depend on the pressure of the opposed gas bearings, which in turn will depend on the pressure of the gas supplied to the feed chamber of the nozzle 120, the configuration of the edge chambers of the nozzle 120 that distribute gas to the ramped surfaces 132a, 132b, and the pore structure of the nozzle 120. The flattening of the portion of the glass tubing 200 opposite to the web surfaces 134a, 134b will also depend on the venting flux at the web surfaces 134a, 134b.

In general, the diameter and lengths of the edge chambers 142a, 142b, 146a, 146b, 148a, 148b (see FIG. 1), the depression of the web surfaces 134a, 134b, the positioning of the edge chambers relative to the ramped surfaces 132a, 132b, and the pressure of the gas supplied to the edge chambers can be appropriately selected to provide the desired gas bearing pressure distribution around the nozzle 120 to form the desired oblong cross-sectional shape in the glass tubing 200. For example, to form an oblong internal cross-sectional shape of 6 mm by 65 mm, the edge chambers can be 3 mm in diameter and be positioned 1.5 mm from the adjacent ramped surfaces. The depressed areas of the web surfaces may be between 0.5 mm and 1.5 mm deep. Gas such as nitrogen or air may be used as the supplied gas. The venting flux in the depressed areas may be 0.5 to 1.5 m$^3$ per hour, measured at 780° C. With this configuration, flat faces can be obtained in the portion of the glass tubing opposite to the web surfaces. The localized gas bearing at the ramped surfaces will also ensure lateral tensioning to help in flatness control of the flat faces. However, it should be clear that the properties of the conforming tool 100 and supplied gas will need to be set based on the shape to be formed and the pressure distribution needed to form the shape and should not be limited to the specific example given above.

It is possible to have web surfaces 134a, 134b without venting flux sites such that gas bearings may be formed between the web surfaces 134a, 134b and the glass tubing 200, e.g., if it is desired to have an oblong cross-sectional shape with splined sides rather than flat sides. In this case, the geometry of the nozzle 120 may be such that the gas bearings formed between the web surfaces 134a, 134b and the glass tubing 200 are different compared to the gas bearings formed between the ramped surfaces 132a, 132b and the glass tubing 200 so that lateral expansion force can be applied to the glass tubing 200 biaxially in different amounts. In general, the portion(s) of the glass tubing 200 where greater lateral expansion is desired will have higher gas bearing pressure than the portion(s) of the glass tubing 200 where lower to no lateral expansion is desired.

In one or more embodiments, the initial circumference of the glass tubing 200, i.e., the circumference before conforming the glass tubing 200 to the final cross-sectional profile, is selected to be smaller than the final circumference of the glass tubing 200, i.e., the circumference after conforming the glass tubing 200 to the final cross-sectional profile. In other words, there will be some geometrical lateral tensioning of the wall of the glass tubing 200 during the reforming. The ratio between the initial circumference and the final circumference is less than 1. Preferably, the ratio between the initial circumference and the final circumference is below 0.96. More preferably, the ration is between 0.7 and 0.95, which will result in stretching of the glass tubing wall by 5 to 30%. The ratio of 0.7 and 0.95 can be used where intentional thinning of the wall of the glass tubing 200 is desired along with the conforming.

A glass sleeve can be cut from a glass tubing shaped using the conforming tool 100 and process described above. In one embodiment, the glass sleeve has a seamless wall and an oblong cross-sectional shape, with an aspect ratio greater than 5:1. Preferably, the aspect ratio is greater than 10:1. In one embodiment, the glass sleeve has an absolute thickness (see 182 in FIG. 13) less than 12 mm. The absolute thickness includes the glass thickness. In one embodiment, the glass sleeve has an absolute width (see 184 in FIG. 13) up to 70 mm. The absolute width includes the glass thickness. In one embodiment, the glass sleeve has an inner surface roughness that is less than 1 μm, preferably in a range from 0.2 nm to 10 nm. In one embodiment, the glass sleeve has an outer surface roughness that is less than 1 μm, preferably in a range from 0.2 nm to 10 nm. In one embodiment, the wall of the glass sleeve has opposing flat sections. The flatness in each of the flat sections is better than 50 μm on 50×90 mm$^2$, as measured by a confocal microscope or mechanical gage system. Preferably, the flatness in each of the flat sections is better than 30 μm on 70×120 mm$^2$, as measured by a confocal microscope or mechanical gage system. Flatness is measured in terms of deviation from a perfectly flat surface. Therefore, the smaller the deviation, the better the flatness. The glass tubing from which the glass sleeve is cut may be made of an ion-exchangeable material so that the glass sleeve can be subjected to an ion-exchange process for chemical strengthening.

Figure 13:
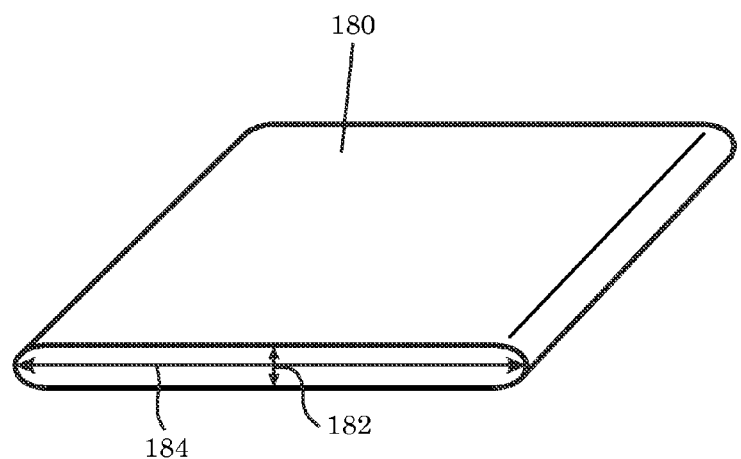
FIG. 13 is a perspective view of a glass sleeve formed by the conforming tool of FIG. 1.

FIG. 13 shows a glass sleeve 180 cut from a glass tubing shaped using the conforming tool 100 and process described above and meeting the requirements described above. Other glass sleeves with different cross-sectional profiles can be similarly formed. The glass sleeve 180 has a mean surface roughness of 0.18 nm, as measured on a Zygo Interferometer, which is comparable to the mean surface of a pristine glass tubing that has not been shaped by the conforming tool 100. This means that, as mentioned earlier, the surface quality of the glass tubing is preserved through the reforming process. In addition, the flat sides of the glass sleeve 180 meet the requirements stated above. The glass sleeve 180 can function as a case for an electronic device. The components of the electronic device can be arranged in the compartment of the glass sleeve 180, with any flat display of the electronic device adjacent to a flat side (or surface) of the glass sleeve 180. The open ends of the glass sleeve 180 can then be sealed with a suitable plug, which may be made of a material other than glass. It is also possible to flame seal one end of the glass sleeve 180 before arranging the components of the electronic device in the glass sleeve. After arranging the components of the electronic device in the glass sleeve 180, the remaining open end of the sleeve 180 can be sealed with a plug. The assembled product will have seamless, same-quality, top and bottom surfaces.

The conforming tool 100 can be used advantageously in a glass tubing process to enable continuous production of a profiled glass tubing. FIG. 14 shows an example of a glass tubing process incorporating the conforming tool 100. The glass tubing apparatus in FIG. 14 is configured to form the glass tubing by a Vello process. However, the conforming tool 100 is not limited to a Vello process. Other glass tubing processes such as the Danner process or downdraw process may also take advantage of the conforming tool 100 to continuously generate a profiled glass tubing having the required cross-sectional shape and wall thickness. In the process shown in FIG. 14, molten glass 500 flows from a tank 502 through an orifice 504 surrounding a bell 506. Air is blown through a hollow tip 508 of the bell 506 to form the glass tubing 510. Below the hollow tip 518 is the conforming tool 100. The glass tubing 510 passes over the conforming tool 100 (160) while the conforming tool 100 (160) shapes the glass tubing 510 to the final cross-sectional profile 512. After the conforming tool 100, the glass tubing 510 progressively passes from a high viscosity state to a frozen state below the softening point (~$10^8$ poise), and advantageously below $10^{11}$ poise for accurate dimensional control.

In one embodiment, the glass tubing 510 turns from the vertical to the horizontal while at a very high viscosity. This would allow the horizontal portion of the glass tubing 510 to be cut periodically, as shown at 514, 516, without disturbing the upper part of the process near the tank and conforming tool. The turning is possible at the very high viscosity state partly because of the relative thinness of the glass tubing, e.g., less than 12 mm, and the large turn radius, e.g., 2 to 4 m. In an alternate embodiment, the glass tubing is not turned from the vertical to the horizontal and the periodic cutting of the glass tubing is operated vertically. Pulling means such as roller or belt tractors can be arranged after the conforming tool to support the glass tubing, and the vertical cutting can take place after the pulling means.

Fine diamond saw cutting may be used in both the horizontal and vertical cutting of the glass tubing. Fine diamond saw cutting would allow straight and close-to-chip free cutting that will only require a final beveling and polishing operation to assure expected aesthetic and mechanical performances. Other methods of cutting, such as laser cutting, may also be used. Large profiled tubes may be initially cut from the continuous profiled glass tubing. Then, smaller sleeves, e.g., of the size suitable for containing a small electronic device, can be cut from the large profiled tubes. The sleeves can be subjected to an ion-exchange process for improved strength.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for making a profiled tubing, comprising:
 a mandrel adapted for positioning proximate a surface of a tubing, the mandrel having a nozzle section with a select cross-sectional profile that will define a final cross-sectional profile of the tubing, the nozzle section having a feed chamber for receiving a gas and a porous circumferential surface through which the gas can be discharged to an exterior of the mandrel, wherein the gas when discharged to the exterior of the mandrel forms a film of pressurized gas between the porous circumferential surface and the tubing;
 wherein the nozzle section is perforated or made of a porous material having a porosity of 10 to 20% and a mean pore size of 10 μm or less.

2. The apparatus of claim 1, further comprising a tubing forming apparatus for forming the tubing, wherein the mandrel is arranged inline with the tubing forming apparatus.

3. The apparatus of claim 1, wherein the porous circumferential surface comprises a pair of edge surfaces that are in opposing relation and ramped relative to a tool axis along which the mandrel is aligned.

4. The apparatus of claim 3, further comprising at least a pair of edge chambers formed in the nozzle section and in communication with the feed chamber, each of the pair of edge chambers being adjacent to and substantially parallel to one of the pair of edge surfaces.

5. The apparatus of claim 3, further comprising a pair of chamber clusters formed in the nozzle section, each chamber cluster comprising at least two edge chambers in communication with the feed chamber, each chamber cluster being adjacent to and substantially parallel to one of the pair of edge surfaces.

6. The apparatus of claim 5, wherein the at least two edge chambers of each chamber cluster are equidistant from the adjacent edge surface.

7. The apparatus of claim 6, wherein the at least two edge chambers of each chamber cluster have different lengths.

8. The apparatus of claim 1, wherein the porous circumferential surface further comprises a pair of side surfaces that are in opposing relation and form webs between the pair of edges surfaces.

9. The apparatus of claim 8, wherein each of the pair of side surfaces has a depressed area.

10. A method of forming a profiled tubing, comprising:
 disposing a mandrel adjacent to a surface of a tubing made of a glass material, the mandrel having a nozzle section with a select cross-sectional profile that will define a final cross-sectional profile of the tubing;
 discharging a gas from a porous circumferential surface of the nozzle section to create a film of pressurized gas between the nozzle section and the surface of the tubing, the film of pressurized gas exerting pressure on the surface of the tubing that is sufficient to locally deform the tubing into conformity with the nozzle section;

advancing the film of pressurized gas along a length of the tubing; and heating the tubing such that in any local section of the tubing where the film of pressurized gas is exerting pressure, the local section of the tubing is at a viscosity at which the local section of the tubing can be deformed by the pressure;

wherein the tubing has an initial circumference before being conformed to the nozzle section and a final circumference after being conformed to the nozzle section, and further comprising selecting the tubing such that a ratio of the initial circumference to the final circumference is between 0.7 and 0.95.

11. The method of claim 10, wherein deformation of the tubing into conformity with the nozzle section comprises stretching a wall of the tubing by 5 to 30%.

12. The method of claim 10, further comprising delivering the gas to a feed chamber in the nozzle section at a pressure of 1 to 10 atm.

13. The method of claim 10, wherein the film of pressurized gas has a thickness in a range from 60 μm to 70 μm.

14. The method of claim 10, further comprising arranging the mandrel inline with a tubing forming apparatus that forms the tubing.

15. The method of claim 10, further comprising cutting at least one sleeve from a section of the tubing that has been deformed into conformity with the nozzle section.

16. The method of claim 10, wherein discharging the gas comprises a combination of discharging the gas from the porous circumferential surface and venting the gas from depressed areas of the porous circumferential surface such that the film of pressurized gas is locally created between the tubing and the nozzle section.

17. An apparatus for making a profiled tubing, comprising:

a mandrel adapted for positioning proximate a surface of a tubing, the mandrel having a nozzle section with a select cross-sectional profile that will define a final cross-sectional profile of the tubing, the nozzle section having a feed chamber for receiving a gas and a porous circumferential surface through which the gas can be discharged to an exterior of the mandrel, wherein the gas when discharged to the exterior of the mandrel forms a film of pressurized gas between the porous circumferential surface and the tubing;

wherein the porous circumferential surface comprises a pair of edge surfaces that are in opposing relation and ramped relative to a tool axis along which the mandrel is aligned.

18. The apparatus of claim 17, further comprising a tubing forming apparatus for forming the tubing, wherein the mandrel is arranged inline with the tubing forming apparatus.

19. The apparatus of claim 17, wherein the nozzle section is perforated or made of a porous material having a porosity of 10 to 20% and a mean pore size of 10 μm or less.

20. The apparatus of claim 17, further comprising at least a pair of edge chambers formed in the nozzle section and in communication with the feed chamber, each of the pair of edge chambers being adjacent to and substantially parallel to one of the pair of edge surfaces.

21. The apparatus of claim 17, wherein the porous circumferential surface further comprises a pair of side surfaces that are in opposing relation and form webs between the pair of edges surfaces.

22. The apparatus of claim 21, wherein each of the pair of side surfaces has a depressed area.

23. The apparatus of claim 17, further comprising a pair of chamber clusters formed in the nozzle section, each chamber cluster comprising at least two edge chambers in communication with the feed chamber, each chamber cluster being adjacent to and substantially parallel to one of the pair of edge surfaces.

24. The apparatus of claim 23, wherein the at least two edge chambers of each chamber cluster are equidistant from the adjacent edge surface.

25. The apparatus of claim 24, wherein the at least two edge chambers of each chamber cluster have different lengths.

26. A method of forming a profiled tubing, comprising:

disposing a mandrel adjacent to a surface of a tubing made of a glass material, the mandrel having a nozzle section with a select cross-sectional profile that will define a final cross-sectional profile of the tubing;

discharging a gas from a porous circumferential surface of the nozzle section to create a film of pressurized gas between the nozzle section and the surface of the tubing, the film of pressurized gas exerting pressure on the surface of the tubing that is sufficient to locally deform the tubing into conformity with the nozzle section;

advancing the film of pressurized gas along a length of the tubing; and heating the tubing such that in any local section of the tubing where the film of pressurized gas is exerting pressure, the local section of the tubing is at a viscosity at which the local section of the tubing can be deformed by the pressure;

wherein deformation of the tubing into conformity with the nozzle section comprises stretching a wall of the tubing by 5 to 30%.

27. The method of claim 26, wherein the tubing has an initial circumference before being conformed to the nozzle section and a final circumference after being conformed to the nozzle section, and further comprising selecting the tubing such that a ratio of the initial circumference to the final circumference is between 0.7 and 0.95.

28. The method of claim 26, further comprising delivering the gas to a feed chamber in the nozzle section at a pressure of 1 to 10 atm.

29. The method of claim 26, wherein the film of pressurized gas has a thickness in a range from 60 μm to 70 μm.

30. The method of claim 26, further comprising arranging the mandrel inline with a tubing forming apparatus that forms the tubing.

31. The method of claim 26, further comprising cutting at least one sleeve from a section of the tubing that has been deformed into conformity with the nozzle section.

32. The method of claim 26, wherein discharging the gas comprises a combination of discharging the gas from the porous circumferential surface and venting the gas from depressed areas of the porous circumferential surface such that the film of pressurized gas is locally created between the tubing and the nozzle section.

* * * * *